United States Patent
Tanaka

Patent Number: 5,359,249
Date of Patent: Oct. 25, 1994

[54] AC GENERATOR WITH TAPERED SLOTS

[75] Inventor: Toshinori Tanaka, Hyogo, Japan

[73] Assignee: Mitsubishi Denki Kabushiki Kaisha, Tokyo, Japan

[21] Appl. No.: 914,314

[22] Filed: Jul. 17, 1992

[30] Foreign Application Priority Data

Jul. 19, 1991 [JP] Japan .................. 3-204818

[51] Int. Cl.⁵ .................. H02K 1/06; H02K 15/00
[52] U.S. Cl. .................. 310/216; 310/42; 29/596
[58] Field of Search .................. 310/42, 216, 217, 218, 310/254, 259; 29/596

[56] References Cited

U.S. PATENT DOCUMENTS

| | | | |
|---|---|---|---|
| 1,675,419 | 7/1928 | Myers | 156/73.6 |
| 1,839,299 | 1/1932 | Cornu | 310/259 |
| 2,562,254 | 7/1951 | Andrus | 310/217 |
| 3,428,842 | 2/1969 | Harris | 310/217 |
| 3,577,851 | 5/1971 | Detheridge | 29/596 |
| 4,116,033 | 10/1978 | Iwaki et al. | 72/142 |
| 4,202,196 | 5/1980 | Asai et al. | 72/137 |
| 4,260,925 | 4/1981 | Barrett | 310/216 |
| 4,672,252 | 6/1987 | Spirk | 310/216 |
| 4,857,788 | 8/1989 | Hein et al. | 310/214 |
| 4,954,734 | 10/1990 | Iguchi et al. | 310/71 |

Primary Examiner—Steven L. Stephan
Assistant Examiner—D. R. Haszko
Attorney, Agent, or Firm—Sughrue, Mion, Zinn, Macpeak & Seas

[57] ABSTRACT

A stator of an AC generator according to the present invention has a stator core which is formed in a ring shape having tooth portions protecting inside said ring shape and forming slots. The width of the slot formed in a stator core is designed in such a manner that, with respect to the depth direction thereof, each inner half section of the slot is a tapered shape having a larger bottom width, and each outer half section of the opening-side of the slot has a constant width between parallel edges, so as to allow a stator coil to be inserted easily between the tooth portions.

5 Claims, 1 Drawing Sheet

5,359,249

AC GENERATOR WITH TAPERED SLOTS

BACKGROUND OF THE INVENTION

The present invention relates to a stator of an AC generator for use in a vehicle or the like. Specifically, the invention relates to a stator of an AC generator including a stator core which is constructed by helically winding at least one winding core element so as to laminate.

Referring to FIG. 4, there is shown a sectional view of a part of a stator core of a conventional AC generator. In FIG. 4, a stator core 1 is constructed by means that at least one winding core member is helically wound so as to laminate itself. Each middle portion in the height direction of tooth portions 4 of the stator core 1 has parallel edges and an equal width. Semi-closed slots 5 among the tooth portions 4 have a tapered width which is smaller in the opening side thereof. Slot insulators 6 and a stator coil 7 which include insulation conductors 8 disposed in the linear portion thereof are inserted into the slots 5, respectively. Wedges 9 are driven into the opening positioned in the slots 5, respectively.

In FIG. 6, the winding core member is shown a shape thereof before winding for constructing the stator core 1. Two winding core members 3 are punched out in a belt shape from a belt-shaped core plate 2 (for example, a silicon steel plate). The tooth portion 4 is formed in such a manner that the middle portions thereof are equal in width and parallel to each other, and each top end portion of the tooth portion 4 is larger in width than the middle portion thereof. A punched-out hole 3a is located between the two tooth portions 4.

Thus, punched-out winding core members 3 are helically wound and laminated thereof so that the top end surfaces of the tooth portions 4 form an inside circle, by use of a producing device so as to construct the stator core 1 which is shown in FIG. 4.

In FIG. 4, due to the fact that the slot 5 has the tapered shape width which is smaller in the opening side thereof, if the insulation conductors 8 are inserted one by one from the opening in the slot 5, then it becomes hard to settle the insulation conductors 8 in the opening side of the slot 5. For this reason, it is difficult to drive the wedge 9 into the slot opening.

In view of the above-mentioned circumstances, as shown in FIG. 5, the top end of a pressing member (not shown) is inserted from the opening of the slot 5 and is then struck with a hammer to thereby push the insulation conductors 8 in the slot 5, before the wedge 9 is driven into the slot opening.

As the above-mentioned stator core of the conventional AC generator, the slot has the tapered width in which the opening side thereof becomes small gradually in width, therefore, it is difficult to settle the insulation conductor 8 of the stator coil 7 in the slot 5. Due to this, there is problems that a slot insulation may receive a damage by means of a strong pressure which is supplied to the insulation conductor 8 for inserting and settling the insulation conductor 8 in the slot 5, and also an efficiency of the producing operation for the AC generator is reduced.

SUMMARY OF THE INVENTION

The present invention aims at eliminating the drawbacks found in the above-mentioned stator core for use in the conventional AC generator. Accordingly, an object of the invention is to provide a stator of an AC generator which allows an insulation conductor of a stator coil to be settled easily in a slot formed in a stator core, so as to eliminate the possibility that the slot insulation may be damaged, and improve the efficiency of the producing operation.

In attaining the above object, according to the invention, there is provide a stator of an AC generator in which the width of a slot formed in a stator core is designed in such a manner that, with respect to the depth direction thereof, each inner half section of the slot is a tapered shape having a larger bottom width, and each outer half section of the opening-side of the slot has a constant width between parallel edges.

Namely, due to the fact that the width of the opening side in the stator core is equal to the width of the middle portion of the slot, the insulation conductor of the stator coil can be easily settled in the slot. Therefore, the present invention eliminates the possibility that the slot insulation may be damaged.

BRIEF DESCRIPTION OF THE INVENTION

DETAILED DESCRIPTION OF THE EMBODIMENT OF THE INVENTION

Figure 1:
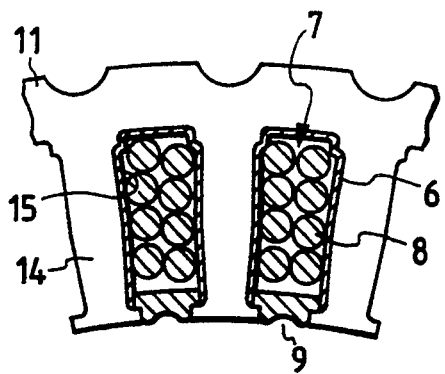
FIG. 1 is a partial sectional view of a slot part of a stator core of an embodiment of an AC generator according to the invention.
Figure 4:
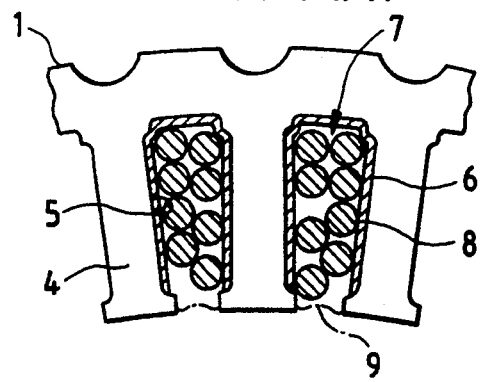
FIG. 4 is a partial sectional view of a slot of a stator core of a conventional AC generator.

Referring now to FIG. 1, there is shown a sectional view of a stator core part of an embodiment of an AC generator according to the invention. In FIG. 1, a stator core 11 is composed of at least one winding core member helically wound so as to laminate on one another. A tooth portion 14 of the stator core 11 includes a base side half section and a top end side half section. With respect to the tooth portion 14, the base side half section includes a constant width and parallel side edges, while the top end side half section is formed in a tapered shape so that the top end portion becomes gradually small width. Therefore, a semi-closed slot 15 shows the shape in which, with respect to the depth direction thereof, an inner half section is tapered shape including a large bottom width and an opening side half section has a constant width and parallel side edges. The slot insulation 6 is put in the slot 15 and the insulation conductors 8 of the stator coil 7 are inserted into the slot 15. Since the slot 15 is formed such that the opening side thereof has parallel side edges, the insulation conductors 8 can be easily inserted in the slot 15, and a wedge 9 can be driven in the slot 15.

Figure 2:
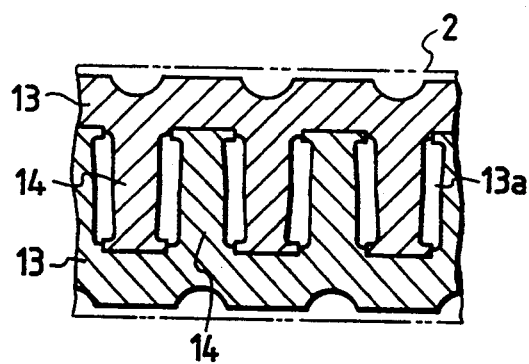
FIG. 2 is a partial plan view of winding core members before they are wound and laminated to construct the stator core shown in FIG. 1.
Figure 5:
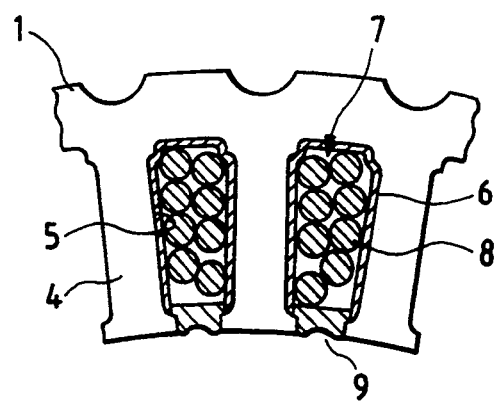
FIG. 5 is a partial sectional view of the slot part, illustrating a state in which a wedge has been driven from the state shown in FIG. 4; and, FIG. 6 is a partial plan view of winding core members before they are wound and laminated on one another to construct the stator core shown in FIG. 4.

FIG. 2 shows a state of the winding core members before they are helically wound so as to laminate thereof to construct the stator core 1. As shown in FIG. 2, two winding core members 13 are punched out in a belt shape from a belt-shaped core plate 2. The shape of the tooth portion 14 of the stator core 1 is formed in such a manner that, with respect to the height direction thereof, the base side half section thereof includes parallel side edges and a constant width, while the top end side half section thereof is formed in a tapered shape, that is, the top end portion become gradually small in width. In this figure, a punched-out hole 13a is located between the two tooth portions 14.

Figure 3:
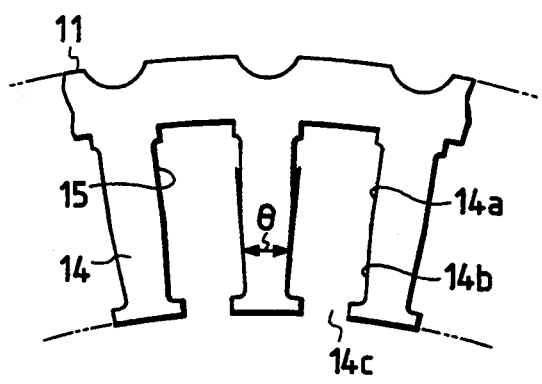
FIG. 3 is a partial plan view of a state in which the winding core members shown in FIG. 2 are wound.
Figure 6:
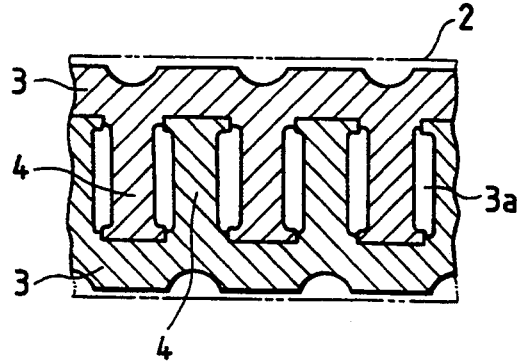

In FIG. 3, there is shown a state in which the winding core member 13 thus punched-out is helically wound such that the top end face of the tooth portion 14 formes the inside circle of the stator 11 by use of an operating device. Then, the winding core member 13 thus helically wound is laminated thereof so as to construct the stator core 11 shown in FIG. 1.

As was described above, according to the present invention, due to the fact that the slot of the stator core is constructed such a manner that, with respect to the depth direction thereof, the inner half section of the slot is tapered in width that the bottom portion thereof being larger, while the opening side half section thereof includes a constant width and parallel side edges, the insulation conductor of the coil can be easily inserted into and settled in the slot, and thus the wedge can also be driven positively. Namely, the present invention prevents the damaged slot insulation and also improves the efficiency of the producing operation of the present AC generator.

What is claimed is:

1. A stator of an AC generator comprising:
   a stator core which is formed in a ring shape having tooth portions projecting inside said ring shape and forming slots which include an inner half section and an opening side half section with respect to a depth direction thereof between said tooth portions, said inner half section being tapered in width so that a bottom portion thereof is wider than any other portion of said inner half section, and said opening side half section including a constant width and parallel side edges; and
   a stator coil which is wound around said stator core through said slots.

2. A stator of an AC generator according to claim 1, wherein said tooth portions include top end faces which form an inside circle of said ring shape.

3. A stator of an AC generator according to claim 2, wherein said stator core is constructed to helically wind at least one winding core member so as to laminate thereof, a shape of said winding core member being a belt shape.

4. A stator of an AC generator according to claim 3, wherein, in said winding core member, said tooth portions having a base side half section corresponding to said inner half section and a top end side half section corresponding to said opening side half section with respect to a height direction thereof, said base side half section including parallel side edges and a constant width, and said top end side half section being formed in a tapered shape so that a top end portion is smaller in width.

5. A stator of an AC generator according to claim 1, wherein top ends of said tooth portions have flanges, respectively, extending toward said slot side.

* * * * *